United States Patent Office 3,654,319
Patented Apr. 4, 1972

3,654,319
ANTHRAQUINONE DYESTUFFS
Rutger Neeff, Leverkusen, Germany, assignor to Farbenfabriken Bayer Aktiengesellschaft, Leverkusen, Germany
No Drawing. Filed May 3, 1967, Ser. No. 635,648
Claims priority, application Germany, May 3, 1966,
F 49,089
Int. Cl. C09b 1/26, 1/50
U.S. Cl. 260—376
12 Claims

ABSTRACT OF THE DISCLOSURE

Anthraquinone dyestuffs of the formula

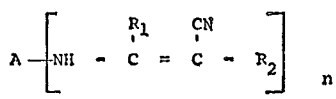

in which A is a substituted or unsubstituted anthraquinone radical; $R_1$ is H, substituted or unsubstituted hydrocarbon; $R_2$ is CN or a carboxylic acid ester radical; and $n$ is a number from 1 to 4; and their prepartion by condensation of N-anthraquinonyl-N'-amidinium salts with cyanoacetic acid esters or malonic dinitrile in the presence of acid-binding agents, e.g. alkali metal oxide, hydroxides carbonates, are disclosed.

This invention relates to new anthraquinone dyestuffs, and the production and use thereof.
The new anthraquinone dyestuffs according to the invention are those of the Formula I:

(I)

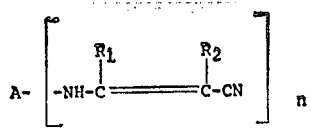

in which A denotes an anthraquinone radical, $R_1$ is hydrogen, an unsubstituted hydrocarbon radical or a substituted hydrocarbon radical; $R_2$ is a carboxylic acid ester radical or a cyano group, and $n$ denotes the number 1 to 4. Formula I is meant to refer to both the cis and trans forms of the dyestuff.
Within the definition of Formula I, a preferred class of dyestuffs of the present invention are those of Formula Ia:

(Ia)

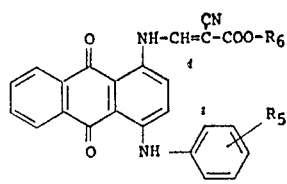

wherein $R_5$ is hydrogen, fluorine, chlorine, bromine, hydroxy, cyano, trifluoromethyl, lower alkyl, lower alkoxy or lower alkoxy lower alkoxy; and $R_6$ is lower alkyl, phenyl lower alkyl, phenyl or lower alkoxy lower alkyl.
A second preferred class of dyestuffs within the definition of Formula I are those of Formula Ib:

(Ib)

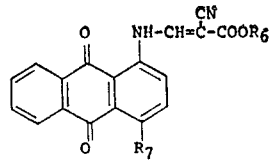

wherein $R_6$ has the above identified meaning and $R^7$ is hydrogen, hydroxy, lower alkoxy, nitro, or amino.
The new dyestuffs are produced, according to the invention, when anthraquinonyl-N'-amidinium salts of the Formula II:

(II)

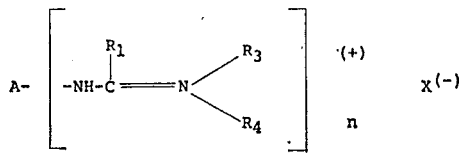

in which A, $R_1$ and $n$ have the same meaning as above, $R_3$ and $R_4$ are hydrogen or alkyl radicals which may be linked with one another, optionally with the inclusion of a hetero atom, or $R_3$ stands for an aryl radical, and X is an anion, are condensed in the presence of acid-binding agents with cyanoacetic acid esters or with malonic dinitrile.
The N-anthraquinonyl-N'-amidinium salts of the Formula II used as starting materials may contain in the anthraquinone radical, besides the grouping

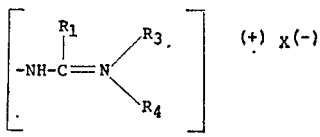

one or more substituents, for example, halogen atoms, such as fluorine, chlorine or bromine; hydroxyl groups; lower alkoxy groups, amino groups; acylamino groups; alkylamino groups with 1 to 3 carbon atoms; cycloalkylamino groups; arylamino groups, wherein the aryl radical is preferably a phenyl group which may be substituted by one or more halogen atoms; alkyl or alkoxy groups; alkyl- or optionally substituted phenyl-sulphonyl groups; alkyl- or optionally substituted phenyl-thiether radicals; cyano, carboxyl, carboxylic acid ester and acetyl groups; alkyl- or optionally substituted phenyl-sulphonylamino groups; or optionally substituted sulphonamide groups. The aforesaid alkyl groups are preferably lower alkyl radicals. By "lower" is meant a carbon content of 1 to 6. The anthraquinone radicals employed in the dyestuffs of the preesnt invention can be tetracyclic i.e. can have a fourth fused ring. In other words the anthraquinone radicals employed in the dyestuffs of the present invention can have up to 4 fused rings. Examples of tetracyclic anthraquinone radicals are 1,9-isothiazoleanthrone,, 1,9-anthrapyrimidine, 1,9-pyrazoleanthrone and N-methyl-1,9-anthrapyridone.
The kind of anion of the N-anthraquinonyl-N'-amidinium salts of the Formula II used according to the invention is of no importance for the condensation with cyanoacetic esters or malonic dinitrile. For example, the anion can be a halogen ion, such as a chlorine or bromine ion, or a nitrate, sulphate, phosphate, boron tetrafluoride, benzene-sulphonate, toluene-sulphonate, oxalate or succinate anion. The nature of the

group of the amidinium salts of the Formula II is likewise of no importance for the condensation with cyanoacetic esters or malonic dinitrile. For example, the

group can be an amino, methylamino, ethylamino, methylethyl-amino, phenylamino, phenyl-methylamino, diethyl-amino, dipropylamino, pyrrolidino, piperidino, morpholino or, preferably, a dimethylamino group.

When $R_1$ is a hydrocarbon radical it can have from 1 to 20 carbon atoms. The radical $R_1$ can be alkyl or aryl. Suitable alkyl radicals include among others lower alkyl, lower alkoxy lower alkyl, lower alkyl ketone lower alkyl. In addition the hydrocarbon radical can be substituted by 1 to 3 but preferably 1 non-interfering substituent which does not materially alter the hydrocarbon nature of the radical. Examples of suitable substituents include among others the halogens such as fluorine, chlorine, bromine or iodine, amino groups, monoalkyl and dialkyl substituted amino groups, and carboxylic acid ester groups. Examples of suitable aryl groups include among others benzene and naphthalene, although benzene is preferred. The aryl groups can be substituted with from 1 to 8 substituents. Suitable substituents include among others the halogens such as fluorine, chlorine, bromine, and iodine, lower alkyl, lower alkoxy, lower alkoxy lower alkyl, lower alkoxy, mercapto, alkyl mercapto, sulphonyl lower alkyl sulphonyl and alkyl groups of 1 to 14 carbon atoms any of which can be substituted by the above described substituents suitable when $R_1$ is alkyl.

Examples of N-anthraquinonyl-N'-amidinium salts of the Formula II are the compounds given below; in the formulae $R_1$ may have the following meaning, for example:

$R_1 =$ H, —$CH_3$, —$C_2H_5$, —$C_3H_7$, —$C_4H_9$, —$C_6H_{11}$, —$C_{17}H_{35}$, NC—$CH_2$—, $CH_3$—O—$CH_2$—, $C_2H_5$—O—$CH_2$—, $CH_3$—O—$C_2H_4$—, —$CF_3$ $C_2H_5OOC$—$CH_2$—$CH_2$—, NH—$CH_2$—$CH_2$, $(CH_3)_2N$—$CH_2$—, $CH_2$=CH—, $CH_3$—CH=CH—

$CH_2$=C(VH$_3$)—, $(C_2H_5)_2CH$—, $CH_3 \cdot CO \cdot CH_2$—, $C_6H_5 \cdot CH_2$—, $C_6H_5$—O—$CH_2$—

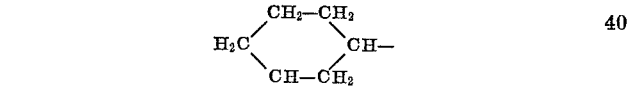

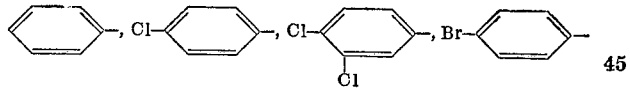

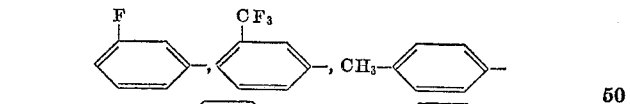

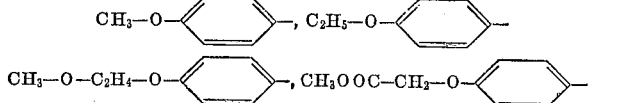

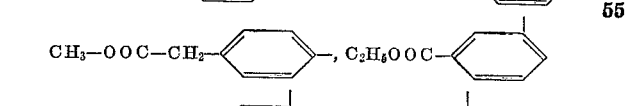

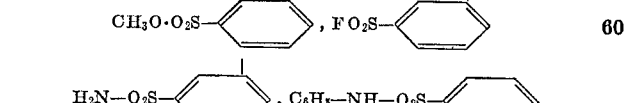

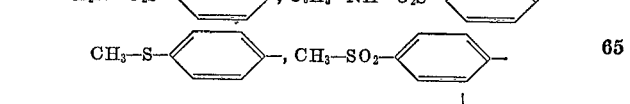

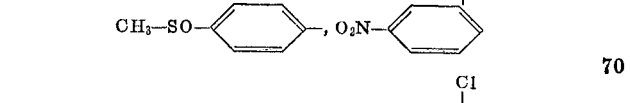

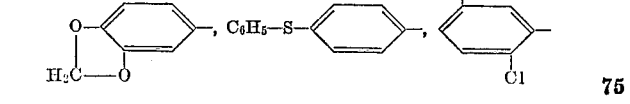

$CH_3$—CO—NH—⌬—, $(CH_3)_2N$—⌬—

⌬N, ⌬N

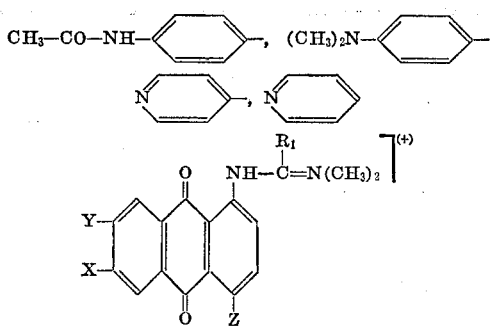

| X | Y | Z |
|---|---|---|
| H | H | OH |
| H | H | OCH$_3$ |
| H | H | OC$_2$H$_5$ |
| H | H | H |
| F | H | H |
| F | F | H |
| —SCH$_3$ | H | H |
| —SC$_6$H$_5$ | H | H |
| —SO$_2$—CH$_3$ | H | H |
| —SO$_2$—C$_6$H$_5$ | H | H |
| H | H | H |
| Cl | H | H |
| Cl | Cl | H |

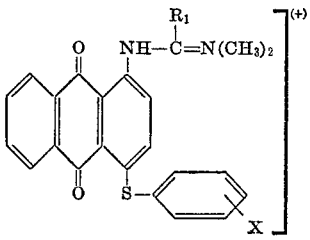

X=H, Cl, Br, F, CH$_3$, —OCH$_3$

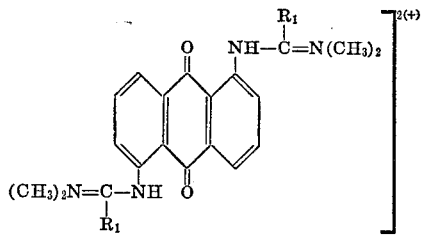

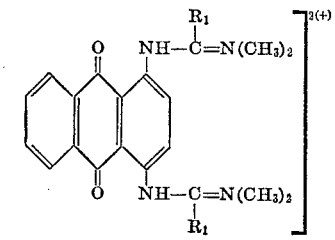

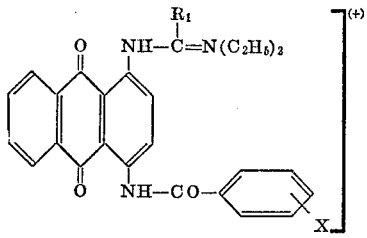

X=H, Cl, Br, CH$_3$, —OCH$_3$, CF$_3$

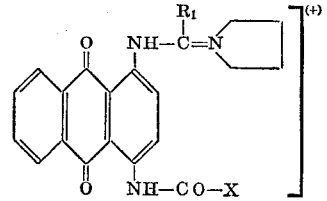

X=CH₃, C₂H₅, C₃H₇, C₄H₉, —CH₂—O—C₂H₅, —CH₂—CN, —CH₂Cl
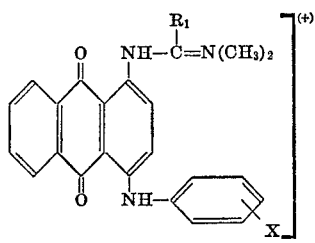
X=H, Cl, F, Br, —CH₃, 2.6—(CH₃)₂, —OCH₃, —O—CH₂—CH₂—OCH₃, —CN, —CF₃, —O—CH₂—O—,
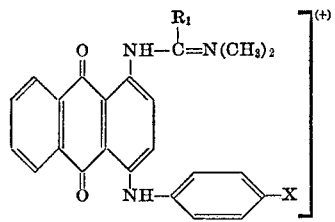
X=H, OH
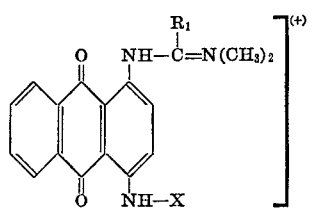
X=H, —CH₃, —C₂H₅, —C₃H₇, —CH₂—CH₂OCH₃, —CH₂—CH₂—CN
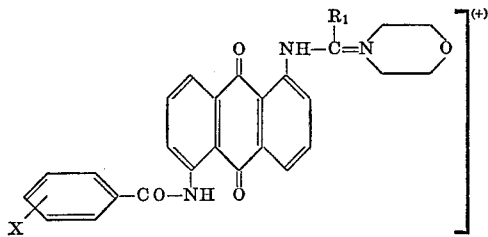
X=H, Cl, Br, —CF₃, —CH₃, —CF₃
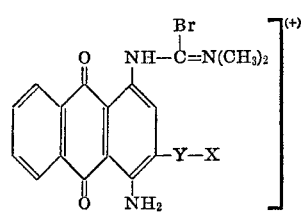
X=—CH₃, —C₂H₅, —CH₂—CH₂—OCH₃, —CH₂—CH₂—O—C₆H₅, —CH₂—CH₂—CN, CH₂—COOC₂H₅,
Y=—O—, —S—, —SO—, —SO₂—
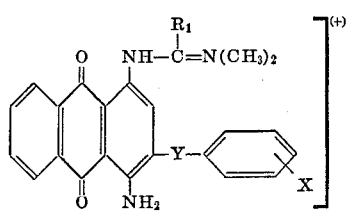
X=H, Cl, Br, F, —CH₃, —OCH₃, —CH₂—CH₂—OCH₃, —OCH₂—COOCH₃
Y=—O—, —S—, —SO—, —SO₂—
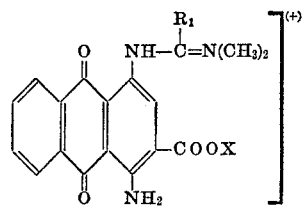
X=H, —CH₃, —C₂H₅, —C₃H₇, —C₄H₉, —O—CH₂—CH₂—OCH₃
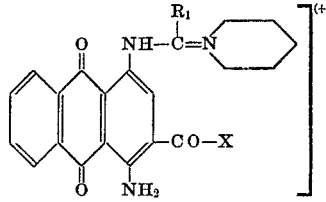
X=—CH₃, —C₂H₅, —C₃H₇
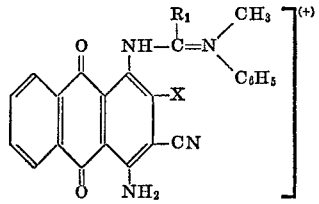
X=H, CN
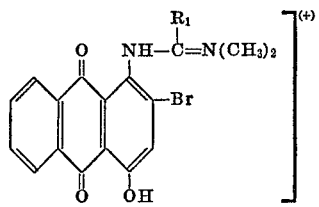
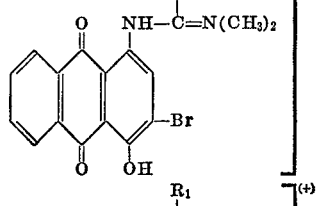
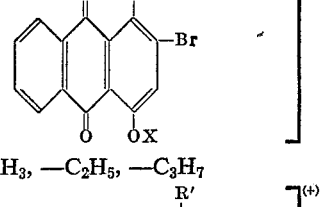
X=H, —CH₃, —C₂H₅, —C₃H₇
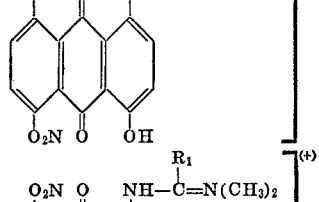

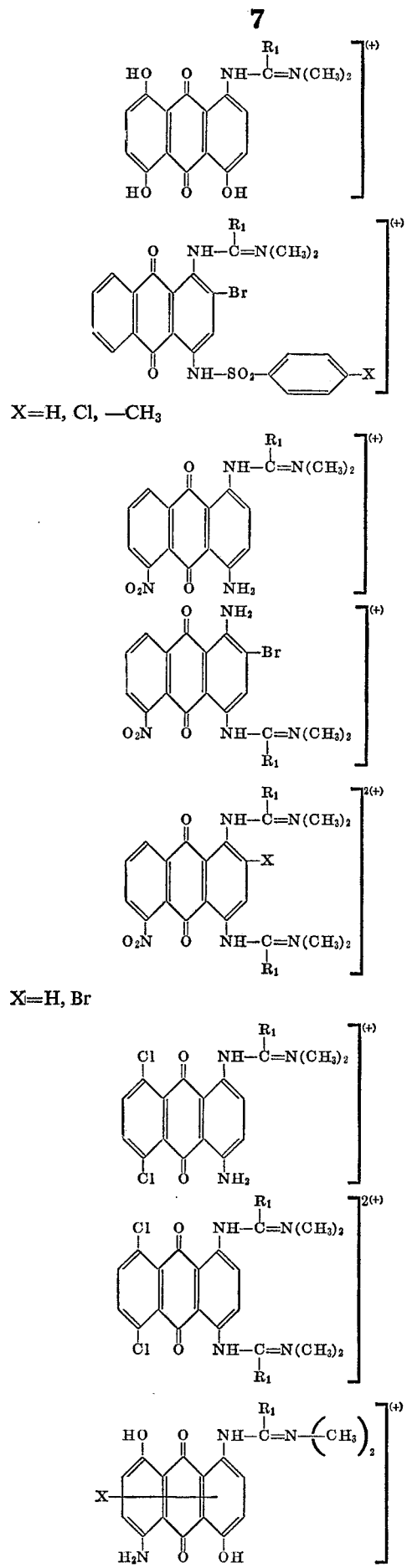

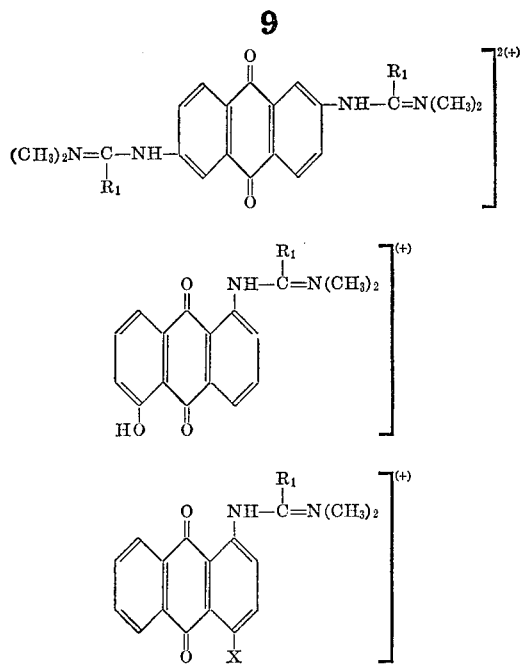

X=NO₂, NH₂

For the condensation of the aforesaid N-anthraquinonyl-N'-amidinium salts of the Formula II there are preferably used alkyl esters with 1 to 6 carbon atoms, the alkyl groups of which may be substituted by one or more substituents of the following type:

Halogen atoms; hydroxyl, alkoxy, hydroxyalkyleneoxy, alkoxyalkylene-oxy or cyano groups; or by amino groups which may be substituted by alkyl, hydroxyalkyl, alkoxyalkyl or cyanoalkyl radicals. Examples of these optionally substituted alkyl groups are the methyl, ethyl, propyl, isopropyl, butyl, isobutyl, amyl or isoamyl groups; the 2-chloro-, 2-bromo-, 2-hydroxy-, 2-methoxy-, 2-ethoxy- or 2-cyanoethyl radicals; the 3-chloro-, 3-hydroxy- or 3-methoxy-propyl groups; the 4-methoxy-butyl radical; the hydroxy-, methoxy- or ethoxy-ethylene-oxy-ethyl groups; and the dimethyl-, diethyl-, bishydroxyethyl-, bismethoxyethyl- or biscyanoethyl-aminoethyl groups.

If cyanoacetic acid aralkyl ester is used, then benzyl ester, p-chloro-, p-methyl- or p-methoxy-benzyl ester are primarily suitable. Preferred cyanoacetic alkenyl esters are the vinyl, propenyl-(1) or propenyl-(2) esters. As cyanoacetic acid aryl ester there is preferably used the phenyl ester which may be substituted in the phenyl group by halogen atoms, such as chlorine or bromine; lower alkyl groups, such as the methyl or ethyl groups; or alkoxy groups, such as the methoxy, ethoxy or β-methoxyethylene-oxy groups.

The process can be carried out in such a manner that the aforesaid N-anthraquinonyl-N'-amidinium salts of the Formula II are condensed with cyanoacetic esters or malonic dinitrile at, for example, 0–250° C. in the presence of an acid-binding agent; the reaction components are used in equivalent amounts or the cyanoacetic ester or malonic dinitrile and the acid-binding agent are used in excess. Organic solvents are expediently used as reaction medium, for example, alcohols, such as ethanol, propanol or ethylene glycol; ether alcohols, such as glycol monomethyl ether or diethylene glycol monomethyl ether; ethers, such as dibutyl ether; esters, such as glycol monomethyl ether acetate; carboxylic acid amides, such as dimethyl formamide; dialkyl-sulphoxides or -sulphones, such as dimethyl sulphoxide or tetramethylene-sulphone; ketones, such as butanone-(2); or hydrocarbons, such as benzene, toluene, chlorobenzene o-dichlorobenzene or nitrobenzene.

Suitable acid-binding agents are, for example, oxides, hydroxides or salts of alkali metals or alkaline earth metals with weak inorganic or organic acids, such as calcium oxide, sodium or potassium hydroxide, sodium or potassium carbonate, sodium or ammonium hydrogen carbonate, sodium or potassium acetate, and also tertiary organic bases, such as triethylamine, N,N-dimethyl-aniline, pyridine, picoline or quinoline, or organic metal compounds, such as sodium methylate and sodium ethylate.

According to another method of carrying out the present process, amino-anthraquinones are converted in known manner in a suitable solvent into the aforesaid N-anthraquinonyl-N'-amidinium salts of the Formula II and the latter are condensed, without isolation, with cyanoacetic esters or malonic dinitrile in the presence of acid binding agents. The dyestuffs (I) are thus obtained in a very simple manner with high yields.

The dyestuffs which can be obtained by the present process are suitable, for example, as pigments for colouring plastic masses fast to migration. However, the dyestuffs or mixtures thereof serve primarily for the dyeing of natural fibres and synthetic materials, preferably polyamides, polyurethanes, polyacrylonitriles, polypropylene and polyesters; the polyesters comprise, in particular, linear aromatic polyesters, such as polyethylene terephthalate or polyesters obtained from terephthalic acid and 1,4-bis-hydroxy-methylcyclohexane, and also cellulose esters, such as cellulose triacetate or cellulose-2½ acetate. It is advantageous to bring the dyestuffs into a fine dispersion by the usual methods, for example, by reprecipitation, grinding or kneading in the presence of dispersing agents, and to apply them according to the known dyeing methods. While cellulose-2½ acetate, for example, is dyed in the presence of Marseilles soap at 60–80° C., cellulose triacetate and polyamide fibres can be dyed at 100° C. For dyeing polyethylene terephthalate fibres, the usual dyeing accelerators can be added or dyeing can be performed at 120–145° C. under pressure. Dyeing and printing is preferably carried out according to the thermosol process in which the printed or dyed fibre materials are briefly heated to temperatures ranging from 180 to 220° C. optionally after an intermediate drying. Heating is generally carried out for periods of time ranging from 30 seconds to 2 minutes.

The dyeings and prints obtained with the dyestuffs which can be prepared according to the present invention are characterised by a very good texture, a high dyestuff yield and clear shades of excellent fastness to light, washing, thermofixing and ironing.

In the following Examples the parts are parts by weight unless otherwise stated.

EXAMPLE 1

(a) 75 parts 1-amino-4-phenylamino-anthraquinone and 18.9 parts dimethyl formamide in 225 parts o-dichlorobenzene are slowly mixed at 50–60° C. with 31.6 parts thionyl chloride; stirring is then continued at 50–60° C. for 1 hour, followed either by further stirring in a vacuum at about 20–200 mm. Hg or by passing through nitrogen or air. The melt which contains grey-violet prisms is then mixed at 50–60° C. with 33 parts cyanoacetic acid ethyl ester, 40 parts of anhydrous sodium acetate are introduced, and stirring is continued at 50–60° C. until the formation of fine grey-blue prisms is completed. After cooling, the product is filtered off with suction, washed with methanol and water, and after drying there are obtained 96 parts β-(4 - phenylamino - 1 - anthraquinonylamino)-α-cyanoacrylic acid ethyl ester or 91% of theory. $C_{26}H_{19}O_4N_3$ (437.3). Calcd. (percent): N, 9.62; O, 14.62. Found (percent): N, 9.71; O, 14.74.

(b) A fabric of polyethylene terephthalate fibres is impregnated on a foulard with a liquor containing, per litre, 20 g. β-(4-phenylamino-1-anthraquinonylamino)-α-cyanoacrylic acid ethyl ester and 10 g. of a thermosol auxiliary, especially a polyether as described, for example, in Belgian patent specification No. 615,102. The fabric is then squeezed to a weight increase of 70% and dried in a suspended nozzle drier or drying cabinet at 80–120° C. The fabric is subsequently treated on a stenter or in a nozzle hot flue at 190–220° C. with hot air for about 45 minutes, then rinsed, reductively after-treated, if desired, then washed, rinsed and dried. The reductive aftertreatment to remove the dyestuff particles which superficially adhere to the fibre can be carried out by introducing the fabric at 25° C. into a liquor containing 3–5 cc./litre of a sodium hydroxide solution at 38° Bé and 1–2 g./litre of concentrated hydrosulphite, heating the bath to 70° C. within about 15 minutes and keeping it at 70° C. for a further 10 minutes. The fabric is subsequently rinsed hot, acidified at 50° C. with 2–3 cc./litre of 85% formic acid, rinsed and dried. A deep blue-grey dyeing is obtained, which is characterised by its high dyestuff yield and very good texture and by excellent fastness to light, thermofixing, washing, rubbing and sublimation. Similarly, a deep blue-grey dyeing is obtained when polyester fibres produced from 1,4-bis-hydroxymethyl-cyclohexane and terephthalic acid, cellulose triacetate fibres or polyamide fibres are used, instead of the polyethylene terephthalate fibres.

(c) A previously cleaned and thermofixed fabric of polyethylene terephthalate fibres is printed with a printing paste consisting of the following components: 40 g. of the dyestuff mentioned in Example 1(b), 475 g. of water, 465 g. of crystal gum 1:2 and 20 g. sulphonated castor oil. An alginate thickener can also be used, instead of crystal gum. The printed and dried material is passed at 190–220° C. over a high capacity stenter or through a condensation apparatus, in order to fix the dyestuff. The duration of the treatment is about 30–60 seconds. The resultant fixed print is subsequently rinsed cold, soaped with 1–2 g./litre of an anion-active detergent at 70–80° C. for about 10 minutes, rinsed first hot and then cold, and dried. A print is thus obtained which corresponds to the dyeing obtained in Example 1(b) and is characterised by the same excellent fastness properties. Similarly a deep blue-grey print is obtained, when polyester fibres produced from 1,4-bis-hydroxymethyl-cyclohexane and terephthalic acid or fibres of cellulose triacetate or polyamide are used, instead of the polyethylene terephthalate fibres.

EXAMPLE 2

32.2 parts N-(4-phenylamino-1-anthraquinonyl)-N′-dimethyl-formamidinium chloride and 17 g. cyanoacetic acid benzyl ester in 150 parts nitrobenzene are mixed at 50–60° C. with 10 g. of anhydrous acetate and the mixture is stirred at 50–60° C. until the formation of the dyestuff in the form of blue-grey prisms is completed. After cooling, the product is filtered off with suction and after washing with methanol and water, there are obtained 36 parts β-(phenylamino - 1 - anthraquinonylamino)-α-cyanoacrylic acid benzyl ester or 90.5% of theory.

$C_{31}H_{21}O_4N_3$: (499.3). Calcd. (percent): N, 8.42; O, 12.81. Found (percent): N, 8.57; O, 12.89.

When applied to polyester fibres obtained from polyethylene terephthalate or from 1,4-bis-hydroxymethylcyclohexane and terephthalic acid, or to fibres of cellulose triacetate or polyamide by dyeing or printing according to Example 1(b) or 1(c), the dyestuff yields blue-grey shades of excellent fastness properties.

Analogous β-(4-phenylamino-1-anthraquinonylamino)-α-cyanoacrylic acid esters are obtained by using for the conversion of N-(4-phenylamino-1-anthraquinonyl)-N′-dimethyl-formamidinium chloride the following esters of cyanoacetic acid, instead of cyanoacetic acid benzyl ester: methyl, ethyl, n-propyl, isopropyl, n-butyl, isobutyl or amylester; 2′-hydroxy-, 2′-chloro-, 2′-bromo-, 2′-cyano-, 2′-methoxy- or 2′-ethoxy-ethyl ester; 3′-methoxypropyl or 4′-methoxy-butyl ester; 2′-(β-hydroxy- or -methoxy-ethylene-oxy)-ethyl ester; 2′-dimethylamino- or 2′-diethyl-amino-ethyl ester; 2′-bis-(β-hydroxyethyl)-, 2′-bis-(methoxyethyl)- or 2′-bis-(β-cyanoethyl)-aminoethyl ester; vinyl or allyl ester; p-chlorobenzyl or 3-phenylpropyl ester; phenyl, p-chlorophenyl or p-methoxyphenyl ester.

EXAMPLE 3

27.4 parts 1-amino-4-(p - methoxy-phenylamino)-anthraquinone and 6.3 parts dimethyl formamide in 150 parts nitro benzene are mixed at 50–60° C. with 10.5 parts thionyl chloride; when the formation of amidinium chloride is completed, the mixture is stirred in a vacuum for about 1 hour. 11 parts cyanoacetic acid ethyl ester are then added, 20 parts anhydrous sodium acetate are introduced, and the mixture is stirred at 50–60° C. until the formation of the dyestuff in the form of dark blue small needles is completed. The product is filtered off with suction when cold, washed with methanol and water, and there are obtained 32 parts β-(4-p-methoxy-phenylamino-1-anthraquinonylamino)-α-cyanoacrylic acid ethyl ester or 86% of theory.

$C_{27}H_{21}O_4N_3$: (467.3). Calcd. (percent): N, 8.99; O, 17.1. Found (percent): N, 8.92; O, 17.26.

When applied to fibres of polyethylene terephthalate, cellulose triacetate or polyamide by dyeing or printing according to Examples 1(b) or 1(c), the dyestuff yields grey-blue shades of excellent fastness to light, washing and thermofixing.

The dyestuffs which are obtained according to Example 3 from appropriately 4-substituted 1-amino-4-aryl-, -aralkyl-, -cycloalkyl- or alkyl-amino-anthraquinones and their shades on polyethylene terephthalate fibers are as stated in the following table:

| Example | Dyestuff | Shade |
|---|---|---|
| 4 | β-(4-p-chlorophenylamino-1-anthraquinonyl-amino)-α-cyanoacrylic acid ethyl ester. | Grey-blue. |
| 5 | β-(4-p-methylphenylamino-1-anthraquinonyl-amino)-α-cyanoacrylic acid ethyl ester. | Do. |
| 6 | β-(4-benzylamino-1-anthraquinonylamino)-α-cyanoacrylic acid ethyl ester. | Greyish blue. |
| 7 | β-(4-cyclohexylamino-1-anthraquinonyl-amino)-α-cyanoacrylic acid ethyl ester. | Do. |
| 8 | β-(4-methylamino-1-anthraquinonylamino)-α-cyanoacrylic acid ethyl ester. | Do. |

EXAMPLE 9

25 parts 1-amino-4-phenylamino-anthraquinone and 6.3 parts dimethyl formamide in 150 parts nitrobenzene are mixed at 50–60° C. with 10.5 parts thionyl chloride; when the formation of amidinium chloride is completed, the mixture is stirred in a vacuum for about 1 hour. 6.6 parts malonic dinitrile are then added, 15 parts of anhydrous sodium acetate are introduced, and the mixture is stirred at 50–60° C. until the dyestuff formation is completed. After cooling, the product which crystallises in the form of dark-violet small needles is filtered off with suction, washed with methanol and water, and there are obtained 29 parts β-(4-phenylamino-1-anthraquinonylamino)-α-cyanoacrylic acid nitrile or 93% of theory.

$C_{24}H_{14}N_4O_2$: (390.3). Calcd. (percent): N, 14.35; O, 8.21. Found (percent): N, 14.28; O, 8.32.

When applied to fibres of polyethylene terephthalate, cellulose triacetate or polyamide by dyeing or printing according to Examples 1(b) or 1(c), the dyestuff yields, with a very good texture and high yield, blue-grey shades which are characterised by excellent fastness to light, washing, thermofixing, rubbing and ironing.

The dyestuffs which are obtained according to Example 9 from appropriately 4-substituted 1-amino-4-aryl-, -aralkyl-, -cycloalkyl- or -alkyl-amino-anthraquinones and their shades on polyethylene terephthalate fibres are stated in the following table:

| Example | Dyestuff | Shade |
|---|---|---|
| 10 | β-(4-p-methoxyphenylamino-1-anthraquinonyl-amino)-α-cyanoacrylic acid nitrile. | Blue-grey. |
| 11 | β-(4-m-chlorophenylamino-1-anthraquinonyl-amino)-α-cyanoacrylic acid nitrile. | Do. |
| 12 | β-(4-benzylamino-1-anthraquinonylamino)-α-cyanoacrylic acid nitrile. | Greyish blue. |
| 13 | β-(4-(2',4',6'-trimethylphenylamino)-1-anthraquinonyl)-α-cyanoacrylic acid nitrile. | Do. |
| 14 | β-(4-cyclohexylamino-1-anthraquinonyl-amino)-α-cyanoacrylic acid nitrile. | Do. |
| 15 | β-(4-methylamino-1-anthraquinonylamino)-α-cyanoacrylic acid nitrile. | Do. |
| 16 | β-(4-m-cyanophenylamino-1-anthraquinonyl-amino)-α-cyanoacrylic acid nitrile. | Blue-grey. |

EXAMPLE 17

28.8 parts N-(4,8-dihydroxy-5-amino-1-anthraquinonyl)-N'-dimethyl-formamidinium chloride and 6.6 parts malonic dinitrile in 180 parts nitrobenzene are mixed at 50–60° C. with 14 parts of anhydrous sodium acetate and the mixture is stirred at 50–60° C. until the dyestuff formation is completed. After cooling, the product which crystallises in the form of grey-violet small needles is filtered off with suction, washed with methanol and water, and there are obtained 27.4 parts β-(4,8-dihydroxy-5-amino-1-anthraquinonylamino) - α-cyanoacrylic acid nitrile or 99.5% of theory.

$C_{18}H_{10}N_4O_4$: (346.3). Calcd. (percent): N, 16.17; O, 18.47. Found (percent): N, 16.03; O, 18.62.

When applied to fibres of polyethylene terephthalate, cellulose triacetate or polyamide by dyeing or printing according to Example 1(b) or 1(c), the dyestuff yields reddish blue shades of excellent fastness to light, washing and thermofixing.

The isomeric β-(4,5-dihydroxy-8-amino-1-anthraquinonylamino)-α-cyanoacrylic acid nitrile, which dyes fibres of polyethylene terephthalate, cellulose triacetate and polyamide according to Example 1(b) in navy-blue shades, is obtained according to Example 17 by using, instead of the amidinium chloride there mentioned, the same amount of N-(4,5-dihydroxy-8-amino-1-anthraquinonyl)-N'-dimethyl-formamidinium chloride.

EXAMPLE 18

28.8 parts N-(4,8-dihydroxy-5-amino-1-anthraquinonyl)-N'-dimethyl-formamidinium chloride and 11 parts cyanoacetic acid ethyl ester in 180 parts nitrobenzene are mixed at 50–60° C. with 14 parts of anhydrous sodium acetate and the mixture is stirred until the dyestuff formation is completed. After cooling, the product which crystallises in the form of reddish blue small needles is filtered off with suction, washed with methanol and water, and there are obtained 30 parts β-(4,8-dihydroxy-5-amino-1-anthraquinonylamino)-α-cyanoacrylic acid ethyl ester of 96% of theory.

$C_{20}H_{15}N_3O_6$: (393.3). Calcd. (percent): N, 10.68; O, 24.4. Found (percent): N, 10.79; O, 24.23.

When applied to fibres of polyethylene terephthalate, cellulose acetate or polyamide by dyeing or printing according to Example 1(b) or 1(c), the dyestuff yields strong reddish blue shades of excellent fastness to light, washing, thermofixing and ironing.

Analogous β-(4,8-dihydroxy-5-amino-1-anthraquinonylamino)-α-cyanoacrylic acid esters are obtained by using for the conversion of N-(4,8-dihydroxy-5-amino-1-anthraquinonyl)-N'-dimethyl-formamidinium chloride, instead of cyanoacetic acid ethyl ester, the following esters of cyanoacetic acid: methyl, n-propyl, isopropyl, n-butyl or isobutyl ester; 2'-hydroxy-, 2'-chloro-, 2'-bromo-, 2'-cyano-, 2'-methoxy- or 2'-ethoxy-ethyl ester; 3'-methoxy-propyl or 4'-methoxy butyl ester; 2'-(β-hydroxy- or -methoxy-ethylene-oxy)- ethyl esters; 2'-dimethylamino- or 2'-diethylamino-ethyl ester; 2'-bis-(β-hydroxyethyl)- 2'-bis-(β-methoxyethyl)- or 2'-bis-(β-cyanoethyl)-amino-ethyl ester; vinyl or allyl ester; benzyl, p-chlorobenzyl or p-methoxybenzyl ester; γ-phenylpropyl ester; phenyl, p-chlorophenyl, p-tolyl, p-hydroxyethylphenyl or 4-pyridyl ester.

Brominated or chlorinated β-(4,8-dihydroxy-5-amino-1-anthraquinonylamino)-α-cyanoacrylic acid esters which give reddish blue dyeings are also obtained, when the brominated or chlorinated N-(4,8-dihydroxy-5-amino-1-anthraquinonyl) - N' - dimethyl-formamidinium chlorides which can be obtained from 1,5-diamino-4,8-dihydroxy-anthraquinones containing 5 to 25% bromine or chlorine and prepared by bromination or chlorination of 1,5-diamino-4,8-dihydroxy-anthraquinone in solvents such as o-dichlorobenzene or sulphuric acid, are reacted according to Example 18 with the aforesaid cyanoacetic acid esters.

EXAMPLE 19

28.8 parts N-(4,5 - dihydroxy-8-amino-1-anthraquinonyl)-N'-dimethyl-formamidinium chloride and 9.65 parts cyanoacetic acid methyl ester in 180 parts nitrobenzene are condensed at 50–60° C. in the presence of 14 parts of anhydrous sodium acetate according to Example 18. There are obtained 27.6 parts or 91.5% of theory of β-(4,5-dihydroxy - 8 - amino-1-anthraquinonylamino)-α-cyanoacrylic acid methyl ester, crystallised in the form of redish blue small needles.

$C_{19}H_{13}N_3O_6$: (379.3). Calcd. (percent): N, 11.08; O, 25.34. Found (percent): N, 11.22; O, 25.14.

When applied to fibres of polyethylene terephthalate, cellulose triacetate or polyamide by dyeing or printing according to Example 1(b) or 1(c), the dyestuff yields strong navy-blue shades of excellent fastness to light, washing, thermofixing and ironing.

Analogous β-(4,5 - dihydroxy-8-amino-1-anthraquinonyl-amino)-α-cyanoacrylic acid esters are obtained by using for the conversion of the N-(4,5-dihydroxy-8-amino-1-anthraquinonyl)-N'-dimethyl-formamidinium chloride, instead of cyanoacetic acid methyl ester, the following esters of cyanoacetic acid: ethyl, n-propyl, isopropyl, n-butyl, isobutyl or amyl esters; 2'-hydroxy-, 2'-chloro-, 2'-bromo-, 2'-cyano-, 2'-methoxy- or 2'-ethoxy-ethyl ester; 3'-methoxy-propyl or 4'-methoxybutyl ester; 2'-(β-hydroxy- or -methoxy-ethylene-oxy)-ethyl ester; 2'-dimethylamino- or 2'-bis-(β-hypdroxyethyl)-amino-ethyl ester; vinyl or allyl ester; benzyl or m-methoxybenzyl ester; γ-phenylpropyl ester; phenyl, m-chlorophenyl, p-t-butyl-phenyl, p-hydroxy-ethoxyphenyl or 3-pyridyl ester.

Brominated or chlorinated β-(4,5-dihydroxy-8-amino-1-anthraquinonylamino)-α-cyanoacrylic acid esters yielding strong navy-blue dyeings are also obtained, when the brominated or chlorinated N-(4,5-dihydroxy-8-amino-1-anthraquinonyl) - N' - dimethyl-formamidinium chlorides which can be obtained from 4,5-dihydroxy-1,8-diamino-anthraquinones containing 5–25% bromine or chlorine and prepared by bromination or chlorination of 4,5-dihydroxy-1,8-diamino-anthraquinone in solvents such as o-dichlorobenzene or sulphuric acid, are reacted according to Example 19 with the aforesaid cyanoacetic acid esters.

EXAMPLE 20

19 parts 4-hydroxy-1-amino-anthraquinone- and 6.3 parts dimethyl formamide in 150 parts o-dichlorobenzene are mixed at 50–60° C. with 10.5 parts thionyl chloride; when the formation of amidinium chloride in the form of yellow-red prisms is completed, the mixture is stirred in a vacuum for about 1 hour. 14 parts cyanoacetic acid-β-methoxyethyl ester and 20 parts of anhydrous sodium acetate are then added and the mixture is stirred at 50–70° C. until the dyestuff formation is completed. After cooling, the product which crystallises in the form of red needles is filtered off with suction, washed with methanol and water, and there are obtained 28.2 parts β-(4-hydroxy-1-anthraquinonylamino)-α-cyanoacrylic acid-β'-methoxyethyl ester of 90.5% of theory.

$C_{21}H_{16}N_2O_6$: (392.3). Calcd. (percent): N, 7.16; O, 24.47. Found (percent): N, 7.23; O, 24.36.

When applied to fibres of polyethylene terephthalate, cellulose triacetate or polyamide by dyeing or printing according to Example 1(b) or 1(c), the dyestuff gives, with a high yield and very good texture, brilliant red shades which are characterised by excellent fastness to light, washing, thermofixing, rubbing and ironing.

Analogous β-(4 - hydroxy-1-anthraquinonylamino)-α-cyanoacrylic acid esters are obtained by using, instead of the cyanoacetic acid-β-methoxyethyl ester mentioned in the present example, the following esters of cyanoacetic acid: methyl, ethyl, n-propyl, isopropyl, n-butyl, isobutyl or amyl ester; 2-hydroxy-, 2'-chloro-, 2'-bromo-, 2'-cyano-, or 2'-ethoxy-ethyl ester; 3'-methoxypropyl or 4'-methoxybutyl ester; 2'-(β-hydroxy- or methoxy-ethylene-oxy)-ethyl ester; 2'-dimethylamino- or 2'-bis-(β-hydroxyethyl)-amino-ethyl ester; vinyl or allyl ester; cyclohexyl or 4'-methyl-cyclohexyl ester; benzyl, 4-chlorobenzyl or 3-methoxybenzyl ester; β-phenylethyl or γ-phenylpropyl ester; phenyl, 4-chlorophenyl, 3-bromophenyl, 3-trifluoromethylphenyl or 4-dimethyl-aminophenyl ester.

EXAMPLE 21

26.2 parts N-(4-hydroxy - 1 - anthraquinonyl)-N'-dimethyl-formamidinium chloride in 150 parts nitrobenzene are mixed at 20° C. with 6.6 parts malonic dinitrile and 14 parts of anhydrous sodium acetate, and the mixture is stirred at room temperature for 5 hours. The product which crystallises in the form of red small needles is filtered off with suction, washed with methanol and water, and there are obtained 22.9 parts β-(4-hydroxyl-1-anthraquinonylamino)-α-cyanoacrylic acid nitrile or 95.3% of theory.

$C_{18}H_9N_3O_3$: (315.2). Calcd. (percent): N, 13.32; O, 15.22. Found (percent): N, 13.35; O, 15.17.

When applied to fibres of polyethylene terephthalate, cellulose triacetate or polyamide by dyeing or printing according to Example 1(b) or 1(c), the dyestuff yields brilliant red shades of excellent fastness to light, washing, thermofixing and rubbing.

EXAMPLE 22

37.6 parts N-(4,8 - dihydroxy-5-amino-6-phenylthio-1-anthraquinonyl) - N' - dimethyl-formamidinium chloride and 11 parts cyanoacetic acid ethyl ester in 240 parts nitrobenzene are mixed at 70–80° C. with 14 parts of anhydrous sodium acetate, and the mixture is stirred until the dyestuff formation is completed. After cooling, the product which crystallises in the form of reddish blue small needles is filtered off with suction, washed with methanol and water, and there are obtained 38.9 parts β-(4,8-dihydroxy - 5 - amino-6-phenylthio-1-anthraquinonyl)-α-cyanoacrylic acid ethyl ester or 97% of theory.

$C_{26}N_{19}N_3O_6S$: (501.4). Calcd. (percent): N, 8.39; O, 19.14. Found (percent): N, 8.51; O, 18.98.

When applied to fibres of polyethylene terephthalate cellulose triacetate or polyamide by dyeing or printing according to Example 1(b) or 1(c), the dyestuff yields reddish blue shades of very good fastness to light, washing and thermofixing.

The dyestuffs which are obtained according to Example 22 from appropriately substituted N-(4,8 - dihydroxy-5-amino - 1 - anthraquinonyl)-N'-dimethyl-formamidinium chlorides, and their shades on polyethylene terephthalate fibres are stated in the following table:

| Example | Dyestuff | Shade |
|---|---|---|
| 23 | β-(4,8-dihydroxy-5-amino-6-methylthio-1-anthraquinonylamino)-α-cyanoacrylic acid methyl ester. | Reddish blue. |
| 24 | β-(4,8-dihydroxy-5-amino-6-phenylsulphonyl-1-anthraquinonylamino)-α-cyanoacrylic acid benzyl ester. | Do. |
| 25 | β-(4,8-dihydroxy-5-amino-6-methylsulphonyl-1-anthraquinonylamino)-α-cyanoacrylic acid 3'-phenylpropyl ester. | Do. Do. |
| 26 | β-(4,8-dihydroxy-5-amino-6-bromo-1-anthraquinonylamino)-α-cyanoacrylic acid methyl ester. | Do. |
| 27 | β-(4,8-dihydroxy-5-amino-7-bromo-1-anthraquinonylamino)-α-cyanoacrylic acid methyl ester. | Do. |

EXAMPLE 28

32.6 parts N-(4,5 - dihydroxy-8-amino-7-methylthio-1-anthraquinonyl)-N'-dimethyl-formamidinium chloride in 180 parts nitrobenzene are condensed according to Example 22 with 17 parts cyanoacetic benzyl ester in the presence of 14 parts of anhydrous sodium acetate. 37.5 parts β-(4,5 - dihydroxy-8-amino-7-methylthio-1-anthraquinonylamino)-α-cyanoacrylic acid benzyl ester or 93.5% of theory are obtained.

$C_{26}H_{19}N_3O_6S$: (501.4). Calcd. (percent): N, 8.39; O, 19.14. Found (percent): N, 8.48; O, 19.01.

When applied to fibres of polyethylene terephthalate, cellulose triacetate or polyamide by dyeing or printing according to Example 1(b) or 1(c), the dyestuff yields navy-blue shades of very good fastness to light, washing and thermofixing.

The dyestuffs which are obtained according to Example 28 from appropriately substituted N-(4,5-dihydroxy-8-1-anthraquinonyl)-N'-dimethyl - formamidinium chlorides, and their shades on polyethylene terephthalate fibres are stated in the following table:

| Example | Dyestuff | Shade |
|---|---|---|
| 29 | β-(4,5-dihydroxy-8-amino-7-phenylthio-1-anthraquinonylamino)-α-cyanoacrylic acid-2'-chloroethyl ester. | Navy blue. |
| 30 | β-(4,5-dihydroxy-8-amino-7-methylsulphonyl-1-anthraquinonylamino)-α-cyanoacrylic acid methyl ester. | Do. |
| 31 | β-(4,5-dihydroxy-8-amino-7-phenylsulphonyl-1-anthraquinonylamino)-α-cyanoacrylic acid ethyl ester. | Do. |
| 32 | β-(4,5-dihydroxy-8-amino-7-bromo-1-anthraquinonylamino)-α-cyanoacrylic acid phenyl ester. | Do. |
| 33 | β-(4,5-dihydroxy-8-amino-6-bromo-1-anthraquinonylamino)-α-cyanoacrylic acid methyl ester. | Do. |

EXAMPLE 34

21.6 parts 4,5,8-trihydroxy-1-amino-anthraquinone and 6.3 parts dimethyl formamide in 150 parts o-dichlorobenzene are mixed at 50–60° C. with 10.5 parts thionyl chloride; when the formation of amidinium chloride is completed, the mixture is stirred in a vacuum for about 1 hour. 11 parts cyanoacetic acid ethyl ester and 20 parts of anhydrous sodium acetate are then added and the mixture is stirred at 50–60° C. until the dyestuff formation is completed. After cooling, the product which crystallises in the form of orange-coloured prisms is filtered off with suction, washed with methanol and water, and there are obtained 28 parts β-(4,5,8-trihydroxy-1-anthraquinonylamino)-α-cyanoacrylic acid ethyl ester or 89.3% of theory.

$C_{20}H_{14}N_2O_7$: (394.3). Calcd. (percent): N, 7.12; O, 28.4. Found (percent): N, 7.23; O, 28.22.

When applied to fibres of polyethylene terephthalate, cellulose triacetate or polyamide by dyeing or printing according to Example 1(b) or 1(c), the dyestuff yields red-yellow shades of very good fastness to thermofixing, light and washing.

Analogous β - (4,5,8-trihydroxy-1-anthraquinonylamino)-α-cyanoacrylic acid esters are obtained by replacing the cyanoacetic acid ethyl ester mentioned in the present example, with the following esters of cyanoacetic acid: methyl, n-propyl or n-butyl ester; 2-hydroxy-, 2-chloro- or 2-methoxy-ethyl ester; benzyl or phenyl ester.

The β - (4,5,8 - trihydroxy-1-anthraquinonylamino)-α-cyanoacrylic acid nitrile which dyes polyethylene terephthalate fibres according to Example 1(b) in orange shades, is obtained by replacing the cyanoacetic acid ethyl ester mentioned above with 6.6 parts malonic dinitrile.

EXAMPLE 35

19 parts 1-amino-5-hydroxy-anthraquinone in 150 parts nitrobenzene are converted into the amidinium chloride according to Example 34 by means of 6.3 parts dimethyl formamide and 10.5 parts thionyl chloride. The melt is mixed with 17 parts cyanoacetic acid benzyl ester and 17 parts of anhydrous sodium acetate, the mixture is stirred at 50–70° C. until the dyestuff formation is completed, the product which crystallises in the form of yellow small needles is filtered off with suction, washed with methanol and water, and there are obtained 32 parts β - (5 - hydroxy-1-anthraquinonylamino)-α-cyanoacrylic acid benzyl ester or 95% of theory.

$C_{25}H_{16}N_2O_5$: (424.3). Calcd. (percent): N, 6.61; O, 18.82. Found (percent): N, 6.72; O, 18.69.

When applied to fibres of polyethylene terephthalate, cellulose triacetate or polyamide by dyeing or printing according to Example 1(b) or 1(c), the dyestuff yields golden yellow shades of very good fastness to light, thermofixing and washing.

Analogous β - (5 - hydroxy-1-anthraquinonylamino)-α-cyanoacrylic acid esters are obtained by replacing the cyanoacetic acid benzyl ester mentioned in the present example with the following esters of cyanoacetic acid: methyl, ethyl, n-propyl or cyclohexyl ester; 2-hydroxy-, 2-chloro-, 2-cyano- or 2-methoxy-ethyl ester; phenyl or p-methoxyphenyl ester.

The β - (5 - hydroxy-1-anthraquinonylamino)-α-cyanoacrylic acid nitrile which dyes polyethylene terephthalate fibres according to Example 1(b) in golden yellow shades is obtained according to Example 35 by replacing the cyanoacetic acid benzyl ester mentioned above with 6.6 parts malonic dinitrile.

EXAMPLE 36

40.4 parts 1-amino-4-methoxy-anthraquinone in 250 parts nitrobenzene are converted into the amidinium chloride according to Example 34 by means of 12.6 parts dimethyl formamide and 21 parts thionyl chloride. The melt is mixed with 22 parts cyanoacetic acid ethyl ester and 40 parts of anhydrous sodium acetate, and the mixture is stirred at 50–70° C. until the dyestuff formation is completed; after cooling, the product which crystallises in the form of coarse brown-orange prisms is filtered off with suction, washed with methanol and water, and there are obtained 53 parts β-(4-methoxy-1-anthraquinonylamino)-α-cyanoacrylic acid ethyl ester or 92% of theory.

$C_{21}H_{16}N_2O_5$: (376.3). Calcd. (percent): N, 7.45; O, 21.24. Found (percent): N, 7.57; O, 21.13.

When applied to fibres of polyethylene terephthalate, cellulose triacetate or polyamide by dyeing or printing according to Example 1(b) or 1(c), the dyestuff yields orange shades of excellent fastness to light, washing, thermofixing, rubbing and ironing.

Analogous β-(4-methoxy-1 - anthraquinonylamino)-α-cyanoacrylic acid esters are obtained by replacing the cyanoacetic acid ethyl ester mentioned in the present Example with the following esters of cyanoacetic acid: methyl, n-propyl, isopropyl, n-butyl, isobutyl or amyl ester; 2'-hydroxy-, 2'-chloro-, 2'-bromo-, 2'-cyano-, 2'-methoxy- or 2'-ethoxy-ethyl ester; 3'-methoxypropyl or 4'-methoxybutyl ester; 2'-(β-hydroxy- or methoxy-ethyleneoxy)-ethyl ester; 2' - dimethylamino- or 2'-diethylamino-ethyl ester; 2' - bis-(β-hydroxyethyl)-, 2'-bis-(β-methoxyethyl) or 2'-bis-(β-cyanoethyl)-aminoethyl ester; vinyl or allyl ester; cyclohexyl or 4' - methyl-cyclohexyl ester; benzyl, 4-chlorobenzyl or 3-methoxybenzyl ester; β-phenylethyl, or γ-phenylpropyl ester; phenyl, 4-chlorophenyl, 3-bromophenyl, 3 - trifluoromethylphenyl- or 4-dimethylamino-phenyl ester.

Analogous β - (5 - alkoxy-1-anthraquinonylamino)-α-cyanoacrylic acid esters are also obtained by using for the condensation with cyanoacetic acid esters, instead of the 4-methoxy-1-amino-anthraquinone mentioned in the present example, the 4-ethoxy-, 4-propoxy- or 4-benzyloxy-1-amino-anthraquinone.

EXAMPLE 37

20.2 parts 1-amino-4-methoxy-anthraquinone in 120 parts nitrobenzene are converted into the amidinium chloride according to Example 34 by means of 6.3 parts dimethyl formamide and 10.5 parts thionyl chloride. 6.6 parts malonic dinitrile and 14 parts of anhydrous sodium acetate are added at 20° C. and the mixture is stirred at room temperature until the formation of the dyestuff in the shape of orange prisms is completed. After filtering off with suction and washing with methanol and water, there are obtained 25 parts β-(4 - methoxy-1-anthraquinonylamino)-α-cyanoacrylic acid nitrile or 95% of theory.

$C_{19}H_{11}N_3O_3$: (329.3). Calcd. (percent): N, 12.76; O, 14.58. Found (percent): N, 12.63; O, 14.64.

When applied to fibres of polyethylene terephthalate, cellulose triacetate or polyamide by dyeing or printing according to Example 1(b) or 1(c), the dyestuff yields orange shades of excellent fastness to light, washing, thermofixing, rubbing and ironing.

If the 4-methoxy-1-amino-anthraquinone mentioned in the present example is replaced with 4-ethoxy-, 4-propoxy- or 4-benzyloxy-1 - amino-anthraquinone, than analogous dyestuffs are obtained, which also dye polyester or polyamide fibres in orange shades.

EXAMPLE 38

23.9 parts 5-nitro-4,8-dihydroxy-1-amino-anthraquinone in 175 parts o-dichlorobenzene are converted into the amidinium chloride according to Example 34 by means of 6.3 parts dimethyl formamide and 10.5 parts thionyl chloride. 17 parts cyanoacetic acid benzyl ester and 12 parts of anhydrous sodium acetate are added and the mixture is stirred at 50–70° C. until the formation of the dyestuff in the shape of red prisms is completed. After cooling, the product is filtered off with suction, washed with methanol and water, and there are obtained 37.5 parts β-(5-nitro-4,8-dihydroxy - 1 - anthraquinonylamino)-α-cyanoacrylic acid benzyl ester or 97% of theory.

$C_{25}H_{15}N_3O_8$: (485.4). Calcd. (percent): N, 8.66; O, 26.39. Found (percent): N, 8.73; O, 26.12.

When applied to fibres of polyethylene terephthalate, cellulose triacetate or polyamide by dyeing or printing according to Example 1(b) or 1(c), the dyestuff yields bluish red shades of excellent fastness to light, washing, and thermofixing.

Analogous β-(5-nitro-4,8-dihydroxy-1-anthraquinonylamino)-α-cyanoacrylic acid esters are obtained by replacing the cyanoacetic benzyl ester mentioned in the present example with the following esters of cyanoacetic acid; methyl, ethyl, n-propyl, isopropyl or butyl ester; 2'-hydroxy-, 2' - chloro-, 2'-cyano-, 2'-methoxy- or 2'-ethoxy-ethyl ester; 3'-methoxypropyl or 4'-methoxybutyl ester; 2'-dimethylamino-ethyl ester; allyl, benzyl, p-chlorobenzyl, phenyl or p-methoxyphenyl ester.

Analogously, β-(8-nitro-4,5-dihydroxy-1-anthraquinonylamino)-α-cyanoacrylic acid esters which dye polyester and polyamide fibres in red shades are obtained by replacing the 5-nitro-4,8-dihydroxy-1-amino-anthraquinone mentioned in the present example with the isomeric 8-nitro-4,5-dihydroxy-1-amino-anthraquinone.

EXAMPLE 39

23.9 parts 5-nitro-4,8-dihydroxy-1-amino-anthraquinone in 150 parts nitrobenzene are converted into the amidinium chloride according to Example 34 by means of 6.3 parts dimethyl formamide and 10.5 parts thionyl chloride. 6.6 parts malonic dinitrile and 14 parts of anhydrous sodium acetate are added at 40–50° C. and the mixture is stirred until the formation of the dyestuff in the shape of red prisms is completed. After filtering off with suction and washing with methanol and water, there are obtained 28.2 parts β-(5 - nitro - 4,8 - dihydroxy-1-anthraquinonylamino)-α-cyanoacrylic acid nitrile or 94% of theory.

$C_{18}H_8N_4O_6$: (376.2). Calcd. (percent): N, 14.88; O, 25.2. Found (percent): N, 14.72; O, 25.62.

When applied to fibres of polyethylene terephthalate, cellulose triacetate or polyamide by dyeing or printing according to Examples 1(b) or 1(c), the dyestuff yields red shades of excellent fastness to light, washing and thermofixing.

EXAMPLE 40

Working analogously as described in Example 39 there is obtainable β - (8 - nitro-4,5-dihydroxy-anthraquinonyl-amino)-α-cyanoacrylic acid nitrile which dyes polyester and polyamide fibres in red shades is obtained by replacing the 5 - nitro - 4,8-dihydroxy-1-amino-anthraquinone mentioned in the present example with the isomeric 8-nitro-4,5-dihydroxy-1-amino-anthraquinone.

EXAMPLE 41

(a) 25 parts N-(1-anthraquinonyl)-N'-dimethyl-formamidinium chloride in 300 parts ethanol are mixed at 20–25° C. with 8.7 parts triethylamine and then with 16 parts cyanoacetic acid benzyl ester. The mixture is slowly heated to boiling temperature and boiled for about 4 hours; after cooling the product which crystallises in the form of yellow small needles is filtered off with suction, and there are obtained 31.3 parts β-(1-anthraquinonylamino)-α-cyanoacrylic acid benzyl ester or 96.5% of theory.

$C_{25}H_{16}N_2O_4$: (408.4). Calcd. (percent): N, 6.86; O, 15.67. Found (percent): N, 6.81; O, 15.72.

When applied to fibres or polyethylene terephthalate, cellulose triacetate or polyamide by dyeing or printing according to Example 1(b) or 1(c), the dyestuff yields clear yellow shades which are characterised by excellent fastness to light, washing, thermofixing, rubbing and ironing.

Analogous β - (1-anthraquinonylamino)-α-cyanoacrylic acid esters are obtained by replacing the cyanoacetic acid benzyl ester mentioned in the present example with the following esters of cyanoacetic acid: methyl, ethyl, n-propyl, isopropyl, n-butyl, isobutyl or amyl ester; 2'-hydroxy-, 2'-chloro-, 2'-bromo-, 2'-cyano-, 2'-methoxy- or 2'-ethoxy-ethyl ester; 3'-methoxypropyl or 4'-methoxy-butyl ester; 2'-(β-hydroxy- or methoxy-ethylene-oxy)-ethyl ester; 2'-dimethylamino- or 2'-diethylamino-ethyl ester; 2'-bis-(β-hydroxyethyl)-, 2'-bis-(β-methoxyethyl)- or 2'-bis-(β-cyanoethyl)-aminoethyl ester; vinyl, allyl or methallyl ester; cyclohexyl or 4-methyl-cyclohexyl ester; p-chlorobenzyl or p-methoxybenzyl ester; β-phenylethyl or γ-phenyl-propyl ester; phenyl, p-chlorophenyl, m-fluoro-phenyl, m-methylphenyl, p-methoxyphenyl or p-dimethyl-amino-phenyl ester.

In an analogous manner, β-(1-anthraquinonylamino)-β-methyl-α-cyanoacrylic acid benzyl ester or β-(1-anthraquinonylamino)-β-phenyl-α-cyanoacrylic acid benzyl ester is obtained by replacing the N-(1-anthraquinonyl)-N'-dimethyl-formamidinium chloride mentioned in the present example with N - (1 - anthraquinonyl) - N' - dimethyl-acetamidinium chloride or N-(1-anthraquinonyl)-N'-dimethyl-benzamidinium chloride.

(b) 10 parts of polyethylene terephthalate fibres are dyed at 125–130° C. for 2 hours in a bath adjusted to pH 4.5 and consisting of 400 parts of water and 0.1 part of finely dispersed β - (1 - anthraquinonylamino) - α-cyano-acrylic acid benzyl ester, and the fibres are subsequently rinsed and dried. A yellow dyeing is obtained, which is characterised by very good fastness properties.

(c) 10 parts of polyethylene terephthalate fibres are dyed at 100° C. for 1½ hours in a bath adjusted to pH 4.5 and consisting of 400 parts of water, 0.1 part of finely dispersed β - (1 - anthraquinonylamino)-α-cyano-acrylic acid benzyl ester and 1.5 parts o-cresotic acid methyl ester. A yellow dyeing is obtained, which is characterised by very good fastness properties.

(d) 10 parts of polyamide fibres are dyes at the boil for 1 hour in a bath consisting of 400 parts of water, 0.2 parts of a conventional dispersing agent and 0.2 part of finely dispersed β - (1 - anthraquinonylamino)-α-cyano-acrylic acid benzyl ester. A clear yellow dyeing of very good fastness properties is obtained. Equally good results are achieved when the polyamide fibres are replaced with polyurethane fibres.

(e) 20 parts of cellulose-2½ acetate fibres are dyes at 75° C. for one hour in a bath consisting of 600 parts of water, 1 part of Marseilles soap and 0.2 part β-(1-anthra-quinonylamino)-α-cyanoacrylic acid benzyl ester. A yellow dyeing of good fastness to light and washing is obtained.

The dyestuffs which are obtained according to Example 41 from appropriately substituted N-(1-anthraquinonyl)-N'-dimethyl-formamidinium chlorides, and their shades on polyester fibres are stated in the following table.

| Example | Dyestuff | Shade |
|---|---|---|
| 42 | β-(6-chloro-1-anthraquinonylamino)-α-cyanoacrylic acid-2'-methoxyethyl ester. | Yellow. |
| 43 | β-(6,7-dichloro-1-anthraquinonylamino)-α-cyanoacrylic acid-benzyl ester. | Do. |
| 44 | β-(6-fluoro-1-anthraquinonylamino)-α-cyanoacrylic acid-2'-phenylethyl ester. | Do. |
| 45 | β-(6,7-difluoro-1-anthraquinonylamino)-α-cyanoacrylic acid propyl ester. | Do. |
| 46 | β-(6-methylthio-1-anthraquinonylamino)-α-cyanoacrylic acid allyl ester. | Do. |
| 47 | β-(6-phenylthio-1-anthraquinonylamino)-α-cyanoacrylic acid cyclohexyl ester. | Do. |
| 48 | β-(6-methylsulphonyl-1-anthraquinonylamino)-α-cyanoacrylic acid phenyl ester. | Do. |
| 49 | β-(6-phenylsulphonyl-1-anthraquinonylamino)-α-cyanoacrylic acid ethyl ester. | Do. |
| 50 | β-(4-(2'-hydroxyethylthio)-1-anthraquinonyl-amino)-α-cyanoacrylic acid methyl ester. | Orange. |
| 51 | β-(4-phenylthio-1-anthraquinonylamino)-α-cyano-acrylic acid-p-methoxybenzyl ester. | Do. |

EXAMPLE 52

25 parts N - (1 - anthraquinonyl-(N'-dimethyl-form-amidinium chloride in 300 parts ethanol are mixed at 20–25° C. with 8.7 parts triethylamine and then with 5.6 parts malonic dinitrile. The mixture is stirred at room temperature until the dyestuff formation is completed, the product which crystallises in the form of yellow small needles is filtered off with suction, and there are obtained 23 parts β-(1-anthraquinonylamino) - α - cyano-acrylic acid nitrile or 96.7% of theory.

$C_{18}H_9N_3O_2$: (299.2). Calcd. (percent): N, 14.03; O, 10.68. Found (percent): N, 13.92; O, 10.76.

When applied to fibres of polyethylene terephthalate, cellulose triacetate or polyamide by dyeing or printing according to Example 1(b) or 1(e), the dyestuff yields clear yellow shades of excellent fastness to light, washing, thermofixing and ironing.

The same dyestuff is obtained according to Example 52, when the ethanol is replaced with solvents such as methanol, propanol, ethylene glycol, glycol monomethyl ether, diethylene glycol monomethyl ether, dibutyl ether, glycol monomethyl ether acetate, dimethyl formamide, dimethyl sulphoxide, tetramethylenesulphone, butanone-(2), benzene, toluene, chlorobenzene, o-dichlorobenzene or nitrobenzene, or when the triethylamine is replaced with acid-binding agents such as calcium oxide, sodium or potassium hydroxide, sodium, potassium or ammonium carbonate or bicarbonate, sodium or potassium acetate, N,N-dimethylaniline, pyridine, picoline or quinoline, sodium methylate or sodium ethylate.

In an analogous manner, β-(1-anthraquinonylamino)-β-methyl-α-cyanoacrylic acid nitrile or β-(1-anthraqui-nonylamino) - β -phenyl - α - cyanoacrylic acid nitrile is obtained by replacing the N - (1 -anthraqui-nonyl) - N' - dimethyl - formamidinium chloride mentioned in the present example with N-(1-anthraquinonyl)-N' - dimethyl-acetamidinium chloride or N-(1-anthraqui-nonyl)-N'-dimethyl-benzamidinium chloride.

The dyestuffs which can be obtained according to Example 52 from appropriately substituted N-(1-anthraqui-nonyl)-N'-dimethyl-formamidinium chlorides, and their shades on polyester fibres are stated in the following table:

| Example | Dyestuff | Shade |
|---|---|---|
| 3 | β-(6-chloro-1-anthraquinonylamino)-α-cyanoacrylic acid nitrile. | Yellow. |
| 54 | β-(6,7-dichloro-1-anthraquinonylamino)-α-cyanoacrylic acid nitrile. | Do. |
| 55 | β-(6-fluoro-1-anthraquinonylamino)-α-cyanoacrylic acid nitrile. | Do. |
| 56 | β-(6,7-difluoro-1-anthraquinonylamino)-α-cyanoacrylic acid nitrile. | Do. |
| 57 | β-(6-methylthio-1-anthraquinonylamino) α-cyanoacrylic acid nitrile. | Do. |
| 58 | β-(6-phenylthio-1-anthraquinonylamino)-α-cyanoacrylic acid nitrile. | Do. |
| 59 | β-(6-methylsulphonyl-1-anthraquinonylamino)-α-cyanoacrylic acid nitrile. | Do. |
| 60 | β-(6-phenylsulphonyl-1-anthraquinonylamino)-α-cyanoacrylic acid nitrile. | Do. |
| 61 | β-(4-ethylthio-1-anthraquinonylamino)-α-cyanoacrylic acid nitrile. | Orange. |
| 62 | β-(4-phenylthio-1-anthraquinonylamino)-α-cyanoacrylic acid nitrile. | Do. |

EXAMPLE 63

22.2 parts 1-amino-5-acetylamino-anthraquinone are converted into the amidinium chloride by means of 6.3 parts dimethyl formamide and 10.5 parts thionyl chloride at 50—60° C., and 11 parts cyanoacetic acid ethyl ester and 20 parts of anhydrous sodium acetate are added. The mixture is stirred at 50–60° C. until the dyestuff formation is completed, the product which crystallised in the form of yellow small needles is filtered off with suction after cooling, washed with methanol and water, and there are obtained 30.2 parts β-(5-acetylamino-1-anthraquinonylamino)-α-cyanoacrylic acid ethyl ester of 94.5% of theory.

$C_{22}H_{17}N_3O_5$: (403.3). Calcd. (percent): N, 10.41; O, 19.83. Found (percent): N, 10.47; O, 19.78.

When applied to fibres of polyethylene terephthalate, cellulose triacetate or polyamide by dyeing or printing according to Example 1(b) or 1(c), the dyestuff yields clear yellow shades of excellent fastness to light, washing, thermofixing and rubbing.

Analogous β-(5-acetylamino-1-anthraquinonylamino)-α-cyanoacrylic acid esters are obtained by replacing the cyanoacetic acid ethyl ester mentioned in the present example with the following esters of cyanoacetic acid: methyl, n-propyl, isopropyl, n-butyl or isobutyl ester; 2'-hydroxy-, 2'-chloro-, 2'-cyano-, 2'-methoxy- or 2'-ethoxyethyl ester; 3'-methoxypropyl or 4'-methoxybutyl ester; 2'-(β-hydroxy- or -methoxyethylene-oxy)-ethyl ester or 2'-dimethylaminoethyl ester; vinyl or allyl ester; cyclohexyl or 4-methyl-cyclohexyl ester; benzyl, 2-phenylethyl- or 3-phenylpropyl ester; phenyl, 4-methoxyethyl or 3-ethoxycarbonyl phenyl ester.

Analogously, β - (5 - acetylamino-1-anthraquinonylamino)-α-cyanoacrylic acid nitrile is obtained by replacing the cyanoacetic acid ethyl ester mentioned in the present example with 6.6 parts malonic dinitrile.

EXAMPLE 64

15 parts 1,5-diamino-anthraquinone are converted into the bis-amidinium chloride by means of 10.5 parts dimethyl formamide and 16.8 parts thionyl chloride in 150 parts nitrobenzene at 50–60° C., 15 parts cyanoacetic acid methyl ester and 30 parts of anhydrous sodium acetate are added, and the mixture is stirred at 50–60° C. until the dyestuff formation is completed. After cooling, the product which crystallises in the form of yellow-orange small needles is filtered off with suction, washed with methanol and water, and there are obtained 28.5 parts 1,5 - bis - (2'-methoxycarbonyl-2'-cyanoethyleneamino)-anthraquinone or 99% or theory.

$C_{24}H_{16}N_4O_6$: (456.4). Calcd. (percent): N, 12.27; O, 21.0. Found (percent): N, 12.33; O, 20.88.

When applied to fibres of polyethylene terephthalate or cellulose triacetate by dyeing or printing according to Example 1(b) or 1(c), the dyestuff yields clear yellow shades of excellent fastness to light, washing and thermofixing. When incorporated in lacquers and varnishes, the dyestuff is a suitable yellow pigment which is fast to light and solvents. When the cyanoacetic acid methyl ester mentioned in the present example is replaced with 10 parts malonic dinitrile, then there is obtained the 1,5-bis-(2,2'-dicyanoethylene-amino)-anthraquinone which dyes polyethylene terephthalate fibres in yellow shades and can also be used for synthetic resin lacquers as a yellow pigment fast to light and solvents.

EXAMPLE 65

20 parts 1,4 - diamino - anthraquinone are converted into the bis-amidinium chloride by means of 14 parts dimethyl formamide and 23.6 parts thionyl chloride in 210 parts nitrobenzene at 50–60° C., 30 parts cyanoacetic acid-β-methoxyethyl ester and 40 parts of anhydrous sodium acetate are added, and the mixture is stirred at 50–60° C. until the dyestuff formation is completed. After cooling the product which crystallises in the form of brown-red needles is filtered off with suction, washed with methanol and water, and there are obtained 42.1 parts 1,4 - bis - (2' - β - methoxyethylcarbonyl - 2' - cyanoethyleneamino)-anthraquinone or 92% of theory.

$C_{28}H_{24}N_4O_8$: (544.4). Calcd. (percent): N, 10.29; O, 23.52. Found (percent): N, 10.37; O, 23.41.

When applied to fibres of polyethylene terephthalate or cellulose triacetate by dyeing or printing according to Example 1(b) or 1(c), the dyestuff yields brownish red shades of very good fastness to light, washing and thermofixing. When the dyestuff is incorporated as pigment in synthetic resin lacquers, a brownish red colouration is obtained, which is fast to light and solvents. When the cyanoacetic acid-β-methoxyethyl ester mentioned in the present example is replaced with 13.8 parts malonic dinitrile, there is obtained 1,5 - bis - (2,2' - dicyanoethyleneamino)-anthraquinone which dyes fibres of polyethylene terephthalate and cellulose triacetate in brownish red shades and can also be used for synthetic resin lacquers as a brownish red pigment fast to light and solvent.

EXAMPLE 66

22.7 parts 4,8 - diamino - 1,5 - dihydroxy - anthraquinone are converted in 210 parts nitrobenzene at 50–60° C. by means of 14 parts dimethyl formamide and 23.6 parts thionyl chloride into the bis-amidinium chloride which crystallises in the form of pale violet prisms, 35 parts cyanoacetic acid benzyl ester and 40 parts sodium acetate are added, and the mixture is stirred at 90–110° C. until the formation of the dyestuff in the shape of blue-violet small needles is completed. After cooling, the product is filtered off with suction, washed with methanol and water, and there are obtained 52 parts 4,8 - bis - (2' - benzylcarbonyl - 2' - cyanoethyleneamino) - 1,5 - dihydroxy - anthraquinone or 96.5% of theory.

$C_{36}H_{24}N_4O_8$: (640.5). Calcd. (percent): N, 8.76; O, 19.95. Found (percent): N, 8.63; O, 19.84.

When applied to fibres of polyethylene terephthalate or cellulose triacetate by dyeing or printing according to Example 1(b) or 1(c), the dyestuff yields red-blue shades of excellent fastness to light, washing and sublimation. When the 4,8 - diamino - 1,5 - dihydroxy - anthraquinone is replaced with the isomeric 4,5 - diamino - 1,8 - dihydroxy-anthraquinone, there is obtained 4,5 - bis - (2'-benzyloxycarbonyl - 2' - cyanoethylene - amino) - 1,8-dihydroxy-anthraquinone which dyes polyester fibres in red-blue shades. When the cyanoacetic acid benzyl ester is replaced with 13.2 parts malonic dinitrile, there is obtained 4,8 - bis - (2',2' - dicyanoethylene - amino)-1,5-dihydroxy- or 4,5 - bis - (2,2' - dicyano - ethyleneamino)-1,8 - dihydroxy - anthraquinone which dye polyester fibres in red-blue shades.

EXAMPLE 67

22.6 parts 1,4,5,8 - tetra - amino - anthraquinone are converted into the tetrakis-amidinium chloride by means of 27 parts dimethyl formamide and 44 parts thionyl chloride in 320 parts nitrobenzene at 70–80° C., 39 parts cyanoacetic acid methyl ester and 75 parts of anhydrous sodium acetate are added, and the mixture is stirred at 110–120° C. until the dyestuff formation is completed. After cooling, the product is filtered off with suction, washed with methanol and water, and there are obtained 57.4 parts 1,4,5,8 - tetrakis - (2' - methoxycarbonyl-2'-cyanoethylene-amino)-anthraquinone or 96.5% of theory.

$C_{34}H_{24}N_8O_{10}$: (704.5). Calcd. (percent): N, 15.89; O, 22.71. Found (percent): N, 15.71; O, 22.52.

The dyestuff can be used for colouring synthetic resins as a red-blue pigment which is fast to light and solvents. When the cyanoacetic acid methyl ester is replaced with 26 parts malonic dinitrile, there is obtained, 1,4,5,8 - tetrakis - (2',2' - dicyanoethylene - amino)-anthraquinone.

EXAMPLE 68

19 parts (N - (1 - anthraquinonyl) - N' - dimethyl-acetamidinium chloride in 100 parts nitrobenzene are mixed at 20° C. with 4.5 parts malonic dinitrile and 9 parts of anhydrous sodium acetate, and the mixture is stirred until the dyestuff formation is completed. The product which crystallises in the form of yellow small needles is filtered off with suction, washed with methanol and water, and there are obtained 16.5 parts β-(1-anthraquinonyl - amino) - α - cyano - crotonic acid nitrile or 91% of theory.

$C_{19}H_{11}N_3O_2$: (313.3). Calcd. (percent): N, 13.4; O, 10.22. Found (percent): N, 13.28; O, 10.29.

When applied to fibres of polyethylene terphthalate, cellulose triacetate or polyamide by dyeing or printing according to Example 1(b) or 1(c), the dyestuff yields clear yellow shades of excellent fastness to light, washing, thermofixing, rubbing and ironing.

The dyestuffs which are obtained according to Example 68 from the corresponding N - (1 - anthraquinonyl)-N' - dimethylamidinium chlorides and malonic dinitrile, and their shades on polyester fibres are stated in the following table:

| Example | Dyestuff | Shade |
|---|---|---|
| 69 | β-(1-anthraquinonylamino)-β-propyl-α-cyanoacrylic acid nitrile. | Yellow. |
| 70 | β-(6-chloro-1-anthraquinonylamino)-β-cyanomethyl-α-cyanoacrylic acid nitrile. | Do. |
| 71 | β-(4-hydroxy-1-anthraquinonylamino)-β-cyclohexyl-α-cyanoacrylic acid nitrile. | Red. |
| 72 | β-(4-phenylamino-1-anthraquinonylamino)-β-ethoxymethyl-α-cyanoacrylic acid nitrile. | Grey-blue. |
| 73 | β-(1-anthraquinonylamino)-β-benzyl-α-cyanoacrylic acid nitrile. | Yellow. |
| 74 | β-(4-methoxy-1-anthraquinonylamino)-β-phenyl-α-cyanoacrylic acid nitrile. | Orange. |
| 75 | β-(1-anthraquinonylamino)-β-(p-methoxyphenyl)-α-cyanoacrylic acid nitrile. | Yellow. |
| 76 | β-(4-hydroxy-1-anthraquinonylamino)-β-(m-chlorophenyl)-α-cyanoacrylic acid nitrile. | Red. |
| 77 | β-(4-acetylamino-1-anthraquinonylamino)-β-(p-ethoxycarbonylphenyl)-α-cyanoacrylic acid nitrile. | Red. |
| 78 | β-(4-phenylamino-1-anthraquinonylamino)-β-(p-dimethylaminophenyl)-α-cyanoacrylic acid nitrile. | Grey-blue. |
| 79 | β-(1-anthraquinonylamino)-β-(4'-pyridyl)-α-cyanoacrylic acid nitrile. | Yellow. |

EXAMPLE 80

25 parts N-(2-anthraquinonyl)-N'-dimethylformamidinium chloride and 17 parts cyanoacetic acid benzyl ester are stirred with 20 parts of anhydrous sodium acetate in 150 parts nitrobenzene at 50–60° C. until the formation of the dyestuff in the shape of greenish yellow small needles is completed. After cooling, the product is filtered off with suction, washed with methanol and water, and there are obtained 31 parts β-(2-anthraquinonyl-amino)-α-cyanoacrylic acid benzyl ester or 95% of theory.

$C_{25}H_{16}N_2O_4$: (408.3). Calcd. (percent): N, 6.87; O, 15.68. Found (percent): N, 6.83; O, 15.72.

The same dyestuff is obtained in an analogous manner by replacing the N-(2-anthraquinonyl)-N'-dimethylformamidinium chloride with N - (2 - anthraquinonyl)-N'-methyl-, -N'-phenyl-, -N'-phenyl-N'-methyl-, N'-diethyl-, -N'-tetramethylene- or -N'-pentamethylene-formamidinium chloride, -bromide, -nitrate or -toluene-sulphonate.

When applied to fibres of polyethylene terphthalate, cellulose triacetate or polyamide by dyeing or printing according to Example 1(b) or 1(c), the dyestuff yields greenish yellow shades of very good fasteness properties.

The dyestuffs which are obtained according to Example 80 from appropriately substituted N-(anthraquinonyl)-N'-dimethylamidinium chlorides and cyanoacetic esters, and their shades on polyethylene terephthalate fibres are stated in the following table:

| Example | Dyestuff | Shade |
|---|---|---|
| 81 | β-(4-hydroxy-2-bromo-1-anthraquinonyl-amino)-α-cyanoacrylic acid methyl ester. | Yellowish red. |
| 82 | β-(4-hydroxy-3-bromo-1-anthraquinonyl-amino)-α-cyanocrotonic acid methyl ester. | Red. |
| 83 | β-(4-methoxy-2-bromo-1-anthraquinonyl-amino)-α-cyanoacrylic acid methyl ester. | Orange. |
| 84 | β-(5-nitro-4-amino-1-anthraquinonylamino)-α-cyanoacrylic acid benzyl ester. | Navy-blue. |
| 85 | β-(3-methoxy-4-amino-1-anthraquinonyl-amino)-α-cyanoacrylic acid methyl ester. | Blue-voilet. |
| 86 | β-(3-phenoxy-4-amino-1-anthraquinonyl-amino)-α-cyanoacrylic acid methyl ester. | Do. |
| 87 | β-(3-bromo-4-amino-1-anthraquinonylamino)-α-cyanoacrylic acid-2'-methoxyethyl ester. | Do. |
| 88 | β-(3-cyano-4-amino-1-anthraquinonylamino)-α-cyanoacrylic acid phenyl ester. | Do. |
| 89 | β-(3-acetyl-4-amino-1-anthraquinonylamino)-α-cyanoacrylic acid-4'-pyridyl ester. | Do. |
| 90 | β-(3-ethoxycarbonyl-4-amino-1-anthraquinonylamino)-α-cyanoacrylic acid ethyl ester. | Do. |
| 91 | β-(3-(2'-hydroxyethylthio)-4-amino-1-anthraquinonylamino)-α-cyanoacrylic acid methyl ester. | Reddish blue. |
| 92 | β-(3-methylsulphonyl-4-amino)1-anthraquinonylamino)-α-cyanoacrylic acid ethyl ester. | Bluish-red. |
| 93 | β-(-3phenylsulphonyl-4-amino-1-anthraquinonylamino)-α-cyanoacrylic acid ethyl ester. | Do. |
| 94 | β-(4-propionylamino-1-anthraquinonylamino)-α-cyanoacrylic acid propyl ester. | Red. |
| 95 | β-(2-bromo-4-p-toluene-sulphonylamino-1-anthraquinonylamino)-α-cyanoacrylic acid ethyl ester. | Yellowish red. |
| 96 | β-(5,8-dichloro-4-amino-1-anthraquinonyl-amino)-α-cyanoacrylic acid benzyl ester. | Blue-violet. |
| 97 | 1,4-bis-(2'-ethoxycarbonyl-2'-cyanoethylene-amino)-5,8-dihydroxy-anthraquinone. | Bluish red. |
| 98 | 5-(2'-methoxycarbonyl-2'-cyanoethylene-amino)-1,9-thiazole-anthrone. | Yellow. |
| 99 | 5-(2'-ethoxycarbonyl-2'-cyanoethylene-amino)-1,9-pyrazole-anthrone. | Do. |
| 100 | 5-(2'-ethoxycarbonyl-2'-cyano-1'-methylethylene-amino)-1, 9-anthrapyrimidine. | Do. |
| 101 | 4-(2'-benzyloxycarbonyl-2'-cyanoethylene-amino)-1-methyl-1, 9-anthrapyridone. | Yellow-red. |

EXAMPLE 102

25 parts N-(2-anthraquinonyl)-N'-dimethyl-formamidinium chloride and 6.6 parts malonic dinitrile in 150 parts nitrobenzene are stirred with 20 parts of anhydrous sodium acetate at 20–30° C. until the formation of the dyestuff in the shape of yellow small needles is completed. After filtering off with suction and washing with methanol and water, there are obtained 22.6 parts β-(2-anthraquinonylamino)-α-cyanoacrylic acid nitrile or 95.1% of theory.

$C_{18}H_9N_3O_2$: (299.2). Calcd. (percent): N, 14.07; O, 10.69. Found (percent): N, 14.01; O, 10.79.

When applied to fibres of polyethylene terephthalate, cellulose triacetate or polyamide by dyeing or printing according to Example 1(b) or 1(c), the dyestuff yields greenish yellow shades of very good fastness properties.

The dyestuffs which are obtained according to Example 102 from appropriately substituted N-(anthraquinonyl)-N'-dimethylamidinium chlorides and malonic dinitrile, and their shades on polyethylene terephthalate fibres are stated in the following table:

| Example | Dyestuff | Shade |
|---|---|---|
| 103 | β-(4-hydroxy-2-bromo-1-anthraquinonyl-amino)-α-cyanoacrylic acid nitrile. | Yellowish red. |
| 104 | β-(4-hydroxy-3-bromo-1-anthraquinonyl-amino)-α-cyanocrotonic acid nitrile. | Red. |
| 105 | β-(4-methoxy-2-bromo-1-anthraquinonyl-amino)-α-cyanoacrylic acid nitrile. | Orange. |
| 106 | β-(5-nitro-4-amino-1-anthraquinonylamino)-α-cyanoacrylic acid nitrile. | Navy-blue. |
| 107 | β-(3-methoxy-4-amino-1-anthraquinonyl-amino)-α-cyanoacrylic acid nitrile. | Blue-violet. |
| 108 | β-(3-phenoxy-4-amino-1-anthraquinonyl-amino)-J-cyanoacrylic acid nitrile. | Do. |
| 109 | β-(bromo-4-amino-1-anthraquinonylamino)-α-cyanoacrlic acid nitrile. | Do. |
| 110 | β-(3-cyano-4-amino-1-anthraquinonyl-amino)-α-cyanoacrylic acid nitrile. | Do. |
| 111 | β-(3-acetyl-4-amino-1-anthraquinonyl-amino)-α-cyanoacrylic acid nitrile. | Do. |
| 112 | β-(3-ethoxycarbonyl-4-amino-1-anthra-quinonyl)-amino)-α-cyanoacrylic acid nitrile. | Do. |
| 113 | β-(3-(2'-hydroxyethylthio)-4-amino-1-anthra-quinonylamino)-α-cyanoacrylic acid nitrile. | Reddish blue. |
| 114 | β-(3-methylsulphonyl-4-amino)-1-anthraquin-onylamino)-α-cyanoacrylic acid nitrile. | Bluish red. |
| 115 | β-(3-phenylsulphonyl-4-amino-1-anthraquin-onylamino)-α-cyanoacrylic acid nitrile. | Do. |
| 116 | β-(4-propionylamino-1-anthraquinonyl-amino)-α-cyanoacrylic acid nitrile. | Red. |
| 117 | β-(2-bromo-4-p-toluene-sulphonylamino-1-anthraquinonylamino-α-cyanoacrylic acid nitrile. | Yellowish red. |
| 118 | β-(5, 8-dichloro-4-amino-1-anthraquinonyl-amino)-α-cyanoacrylic acid nitrile. | Blue-violet. |
| 119 | 1, 4-bis-(2', 2'-dicyano-ethylene-amino)-5, 8-dihydroxy-anthraquinone. | Bluish red. |
| 120 | 5-(2', 2'-dicyano-ethylene-amino)-1, 9-thiazole-anthrone. | Yellow. |
| 121 | 5-(2', 2'-dicyano-ethylene-amino)-1, 9-pyrazole-anthrone. | Do. |
| 122 | 5-(2', 2'-dicyano-1'-methyl-ethylene-amino)-1, 9-anthrapyrimidine. | Do. |
| 123 | 4-(2', 2'-dicyano-ethylene-amino)-1-methyl-1, 9-anthrapyridone. | Yellow-red. |

What is claimed is:
1. A compound of the formula

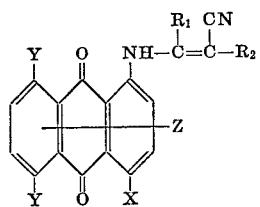

wherein $R_1$ is hydrogen; unsubstituted lower alkyl; substituted lower alkyl containing 1 to 3 substituents selected from the group consisting of CN and lower alkoxy; unsubstituted phenyl; substituted phenyl wherein the substituents are selected from the group consisting of Cl, lower alkoxy, di(lower)alkylamino and lower alkoxy carbonyl; cyclohexyl; benzyl; or pyridyl; $R_2$ is —COOR$_6$; $R_6$ is phenyl, bromophenyl, chlorophenyl, phenyl lower alkyl; pyridyl; lower alkoxy lower alkyl; cyclohexyl; 4-methylcyclohexyl; hydroxyethyl; chloroethyl; bromoethyl or cyanoethyl; X is H;

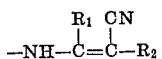

—NH$_2$; OH; NO$_2$; benzylamino; lower alkylamino; cyclohexylamino; lower alkoxy; lower alkyl mercapto phenylmercapto lower alkyl carbonylamino; tosylamino; or

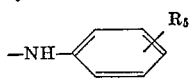

wherein $R_5$ is H, Cl, CN, lower alkyl or lower alkoxy; Y is H;

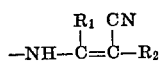

NH$_2$; OH or NO$_2$; Z is Cl; Br; F; lower alkoxy; lower alkyl mercapto; phenyl mercapto; lower alkylsulfonyl; or phenyl sulfonyl.

2. An anthraquinone dyestuff of claim 1 having the formula

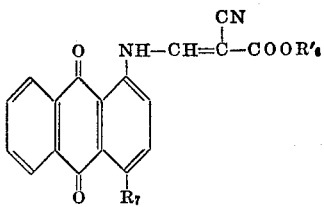

wherein R′$_6$ is phenyl lower alkyl, phenyl, lower alkoxy lower alkyl, cyclohexyl or 4-methyl cyclohexyl; and $R_7$ is hydrogen, hydroxy, lower alkoxy, nitro, or amino.

3. The dyestuff of claim 2 wherein $R_7$ is hydroxy.

4. The compound of claim 1 wherein Y is H and Z is H.

5. An anthraquinone dyestuff of claim 1 having the formula

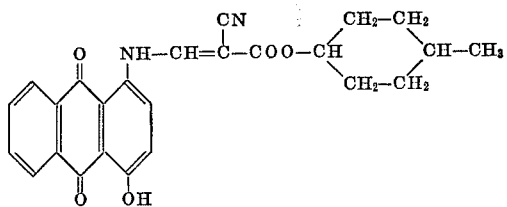

6. Dyestuff of claim 1 having the formula:

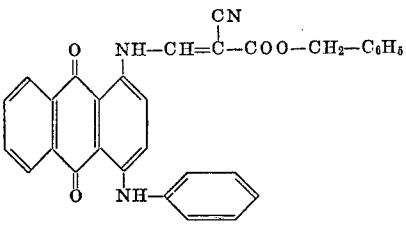

7. Dyestuff of claim 1 having the formula:

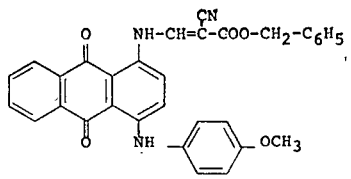

8. Dyestuff of claim 1 having the formula:

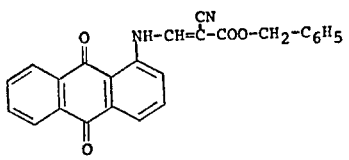

9. Dyestuff of claim 1 having the formula:

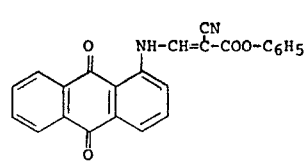

10. Dyestuff of claim 1 having the formula:

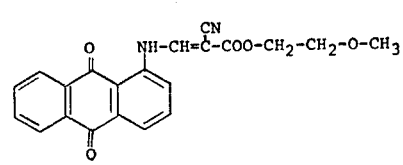

11. Dyestuff of claim 1 having the formula:
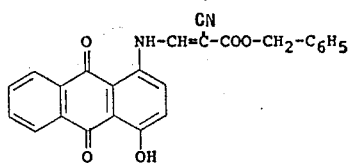
12. Dyestuff of claim 1 having the formula:
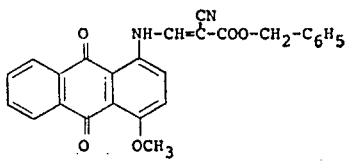
References Cited
UNITED STATES PATENTS
3,411,861  11/1968  Guenthard et al. ____ 260—376
OTHER REFERENCES
Sivasankaran et al., Chem Ab. v. 57, 3591 (1957).
Bredereck et al., Ber. 97 (12) 3397–3403 (1964).
LORRAINE A. WEINBERGER, Primary Examiner
E. J. SKELLY, Assistant Examiner
U.S. Cl. X.R.
8—39, 40; 260—256.4 Q, 272, 278, 303, 312, 371, 372, 373, 374, 378, 379, 380, 381

UNITED STATES PATENT OFFICE
CERTIFICATE OF CORRECTION

Patent No. 3,654,319     Dated April 4, 1972

Inventor(s) RUTGER NEEFF

It is certified that error appears in the above-identified patent and that said Letters Patent are hereby corrected as shown below:

| Column | Line | Error |
|---|---|---|
| 2 | 1 | "$R^7$" should read --$R_7$--. |
| 2 | 39 | "thiether" should read --thioether--. |
| 3 | 21 | "alkoxy, mercapto" should read --alkoxy lower alkoxy, mercapto--. |
| 3 | Formula 1, 37 | "$(VH_3)-$, $C_2H_5$)" should read --$(CH_3)-$, $(C_2H_5)$--. |
| 12 | 26 | "dryeing" should read --dyeing--. |
| 16 | 5 | "cyanoacetic benzyl" should read --cyanoacetic acid benzyl--. |
| 18 | 17 | "than" should read --then--. |
| 21 | Table 5 | "3" should read --53--. |
| 24 | Table Ex.85 | "methyl" should read --ethyl--. |
| 25 | Table Ex.108, | "J" should read -- α --. |
| 25 | Table Ex.109, | " β-(bromo-" should read --β-(3-bromo --. |
| 25 | 63 | after "mercapto" there should be --;-- (a semicolon). |
| 25 | 64 | after "phenylmercapto" there should be --;-- (a semicolon). |

Signed and sealed this 22nd day of January 1974.

(SEAL)
Attest:

EDWARD M. FLETCHER, JR.
Attesting Officer

RENE D. TEGTMEYER
Acting Commissioner of Patents